(12) United States Patent
Havas (10) Patent No.: US 8,725,593 B2
(45) Date of Patent: May 13, 2014

(54) REDEEMABLE GIFT MESSAGE (75) Inventor: Peter Roy Havas, San Francisco, CA (US)

(73) Assignee: Specialty's Cafe and Bakery, Inc., San Francisco, CA (US)

( * ) Notice: Subject to any disclaimer, the term of this patent is extended or adjusted under 35 U.S.C. 154(b) by 0 days.

(21) Appl. No.: 12/267,408

(22) Filed: Nov. 7, 2008

(65) Prior Publication Data

US 2010/0211478 A1    Aug. 19, 2010

(51) Int. Cl.
*G06Q 30/00* (2012.01)
(52) U.S. Cl.
USPC ........................... 705/26.8; 705/26.1
(58) Field of Classification Search
USPC ........................... 705/26, 26.1–27.2
See application file for complete search history.

(56) References Cited

U.S. PATENT DOCUMENTS

| | | | |
|---|---|---|---|
| 389,904 A | 2/1973 | Carraizo | |
| 4,797,818 A | 1/1989 | Cotter | |
| 6,321,211 B1 * | 11/2001 | Dodd | 705/26 |
| 6,618,062 B1 | 9/2003 | Brown et al. | |
| 6,865,546 B1 * | 3/2005 | Song | 705/26 |
| 7,130,817 B2 | 10/2006 | Karas et al. | |
| 7,149,710 B1 | 12/2006 | Edmark | |
| 8,190,519 B1 * | 5/2012 | Angilivelil et al. | 705/39 |
| 2002/0032613 A1 | 3/2002 | Buettgenbach et al. | |
| 2002/0178089 A1 * | 11/2002 | Bezos et al. | 705/26 |
| 2003/0061566 A1 | 3/2003 | Rubstein et al. | |
| 2003/0130907 A1 * | 7/2003 | Karas et al. | 705/26 |
| 2007/0061225 A1 | 3/2007 | Havas | |
| 2008/0052164 A1 * | 2/2008 | Abifaker | 705/14 |
| 2009/0063295 A1 * | 3/2009 | Smith | 705/26 |

OTHER PUBLICATIONS

Intelisys brings the power of the internet to Cheryl&Co. (Jul. 27, 2000). PR Newswire, pp. 1-1.*
U.S. Appl. No. 10/206,682, Havas.

* cited by examiner

*Primary Examiner* — Resha Desai
(74) *Attorney, Agent, or Firm* — Jeffrey Schox (57) ABSTRACT

A method for enabling redeemable gift messages to be ordered and sent comprises presenting a webpage for customer orders by means of a server. After receiving a response from a customer that a redeemable gift message has been selected, the server presents information on a webpage to the customer to enable the customer to order a redeemable gift message. After receiving a redeemable gift message order from the customer, the server sends a redeemable gift message or an invitation to accept or reject the message to a recipient designated by the customer. A system for implementing the above method comprises a storage that stores at least one order form; and a processor that presents a webpage for customer orders, the at least one order form from the storage, and sends a redeemable gift message or an invitation to accept or reject the message to a recipient designated by a customer according to information on the customer order form. The gift may be a cookie or cookies.

13 Claims, 15 Drawing Sheets

Specialty's CookieMessage

Now customize each Specialty's CookieMessage by choosing the number of cookies to include with the Specialty's CookieMessage ($1.95 per cookie) along with the first and last names of the recipient. A special note can be added to the Specialty's CookieMessage using the "note" field.

All fields on this form are OPTIONAL. You can choose to customize your Specialty's CookieMessage as much or as little as you wish. When you're done, click the NEXT button at the bottom of this page to continue.

ccarrett@specialtys.com

First name: Cameron
Last name: Carrett
Notes: (max 2000 chars) Thanks for your help with the recent project. regards, Peter Qty: 3

Specialty's Café & Bakery, Inc. accepts no responsibility for the content of messages sent via Specialty's CookieMessage next

*FIG. 7*

Specialty's CookieMessage

Your order summary is below

| Qty | Recipient | Item | Line |
|---|---|---|---|
| 3 | Cameron Carrett<br>(ccarrett@specialtys.com)<br>SEND ASAP<br>"Thanks for your help with the recent project. regards, Peter"<br>preview | 1.95 | 5.85 |
| TOTAL | | | 5.85 |

Please choose a payment option below

[ pay with Credit Card ]  [ pay with My Account ]

To make changes to your Specialty's CookieMessage before sending click GO BACK

[ ◀◀ Go Back ]

If you choose to pay with a credit card, your credit card will be billed for each Specialty's CookieMessage individually. As each Specialty's CookieMessage is accepted by the recipient, the individual transactions are completed. If a Specialty's CookieMessage has not been accepted within 30 days it will be cancelled and credit card authorization dropped.

Account orders will be billed upon completion of this order. Specialty's CookieMessage that have not been accepted after 30 days are cancelled and refunded to the account used in the order.

Specialty's CookieMessage can only be cancelled BEFORE being accepted.

| Exit | Cmd | Takeover | | Sandwich | Soups | Salad | Back |
|---|---|---|---|---|---|---|---|
| SPEC INST | Day Old | 50% Emp | Breakfast | Brd/desserts | COOKIES | Misc | Day old |

| Clerk 1  Custom 1 | | Basic | Deluxe | Veggie | Hot |
|---|---|---|---|---|---|
| | 1 | Tuna Salad | Turkey Cranberry | Peanut Butter n Stuff | Hot Alby |
| | 2 | Roasted Turkey | Big BLT | Tomato Mozz | Hot Hammer |
| | 3 | Smoked Ham | The Club | Four Cheese | Hot BBQ Chicken |
| | 4 | Salami | Turkey Pesto | Vegetarian | Hot BBQ Beef |
| | 5 | Roast Beef | The Cobb | The Nutty Banana | Hot Italian |
| | 6 | Side of Meat | The Chairman | The Mediterranean | Hot Cheesy Steak |
| | 7 | Kid's Menu | The Sicilian | SUB BREAD | Hot Roasted Veggie |
| | 8 | Chips | Beef n Bleu | FOOD MOD | toast |
| | 9 | Cookies | Fruit | no Black Pepper | no toast |
| | 0 | | | | |

| | Cookie alert | Cash | | | PAYMENT |
|---|---|---|---|---|---|
| TOTAL  $0.00 | | | $5 | $20 | |
| Name | Cookie Message | | $10 | Next dollar | |
| Up | Add | Status | | | |
| Down | Less | Ingredients | | | |

REDEEMABLE GIFT MESSAGE

BACKGROUND OF THE INVENTION

This invention relates to methods and systems for redeemable gift messages to be ordered, sent and redeemed, and in particular to methods and systems for ordering, sending and redeeming cookie messages.

There is a gap in the "Thank You" market. People often wish to say "thank you" in a way that is convenient and not expensive. But they want to do something more meaningful than simply send an e-mail to express their appreciation to the recipient. It is therefore desirable to provide solutions whereby such need can be fulfilled.

SUMMARY OF THE INVENTION

The need indicated above may be met by enabling customers to select a redeemable gift, sending a redeemable message by which the gift may be redeemed, such as at a point-of-sale facility or through other alternative channels of commerce.

In one embodiment, a method for enabling redeemable cookie messages to be ordered and sent comprises presenting a webpage for customer orders by means of a server. After receiving a response from a customer that a redeemable cookie message has been selected, the server presents information on a webpage to the customer to enable the customer to order a redeemable cookie message. After receiving a redeemable cookie message order from the customer, the server sends a redeemable cookie message or an invitation to accept or reject the message to a recipient designated by the customer.

In another embodiment, a system for enabling redeemable cookie messages to be ordered and sent comprises a storage that stores at least one order form; and a processor that presents a webpage for customer orders, at least one order form from the storage on a webpage, and sends a redeemable cookie message or an invitation to accept or reject the message to a recipient designated by a customer according to information on the customer order form.

In yet another embodiment, a method for enabling redeemable gift messages to be ordered and sent comprises presenting a webpage for customer orders by means of a server. After receiving a response from a customer that a redeemable gift message has been selected, the server presents information on a webpage to the customer to enable the customer to order a redeemable gift message. After receiving a redeemable gift message order from the customer, the server sends a redeemable gift message or an invitation to accept or reject the message to a recipient designated by the customer.

In still another embodiment, a system for enabling gifts to be ordered and sent comprises a storage that stores at least one order form; and a processor that presents a webpage for customer orders, at least one order form from the storage, and sends a redeemable gift message or an invitation to accept or reject the message to a recipient designated by a customer according to information on the customer order form.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

Identical components in this application are labeled by the same numerals.

DETAILED DESCRIPTION OF EXEMPLARY EMBODIMENTS

Figure 1:
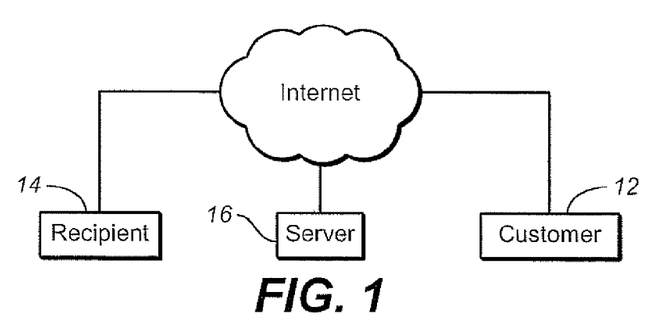
FIG. 1 is a diagram illustrating a block diagram illustrating one embodiment of the invention.

FIG. 1 is a block diagram illustrating one embodiment of the invention. As shown in FIG. 1, a customer information appliance 12 (for customer who may wish to send a redeemable cookie message to a recipient), and the recipient information appliance 14 (for recipient to whom the message is to be sent), and a server 16 are connected to a network 10, such as the world wide web or internet. The information appliances 12 and 14 employed by the customer and the recipient may be any one of many types of different devices that can be used to perform the operations described below through the internet, including desktop, laptop and notebook computers, cellular telephones, personal digital assistants, MP3 players and other types of digital media players, set top boxes and other type of devices.

Figure 2:
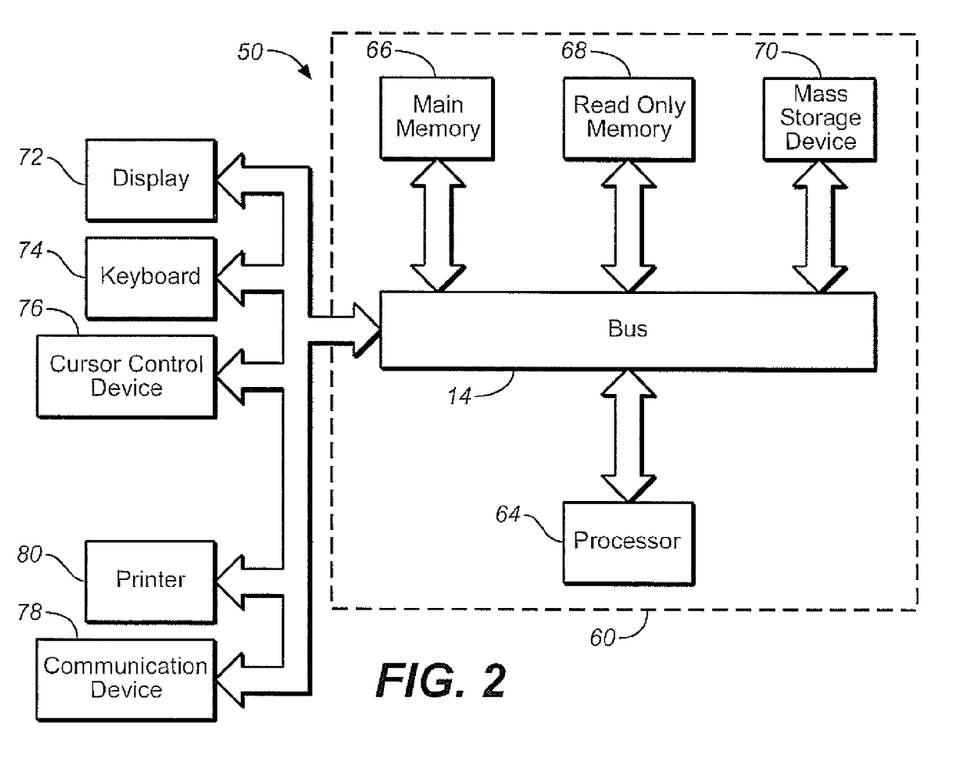
FIG. 2 is an example of a computer system for implementing the embodiment of FIG. 1.

FIG. 2 is an example of a computer system 50, which together with peripherals, may be used for implementing the server 16 in the embodiment of FIG. 1. As shown in FIG. 2, the computer system 50 includes a computer bus 14. Various applications are software stored in the mass storage device 70. Processor 64 reads the application software from device 70 into the main memory 66 and executes the code in the software in a manner known to those skilled in the art to perform the various functions described herein. Forms (e.g. those of FIGS. 5-8), webpages and customer data may reside in the mass storage device 70. The computer system 50 may be operated by the user via keyboard 74 and cursor control device 76. Computer system 50 communicates with external systems such as the information appliances for the customer 12 and recipient 14 in FIG. 1 through the internet 10 and communication device 78, which may be a modem or a wireless communication device such as WI-FI, Blue Tooth, infrared systems, or radio waves systems. Display 72 and printer 80 may be used to print or display information present on the bus 14.

Figure 3:
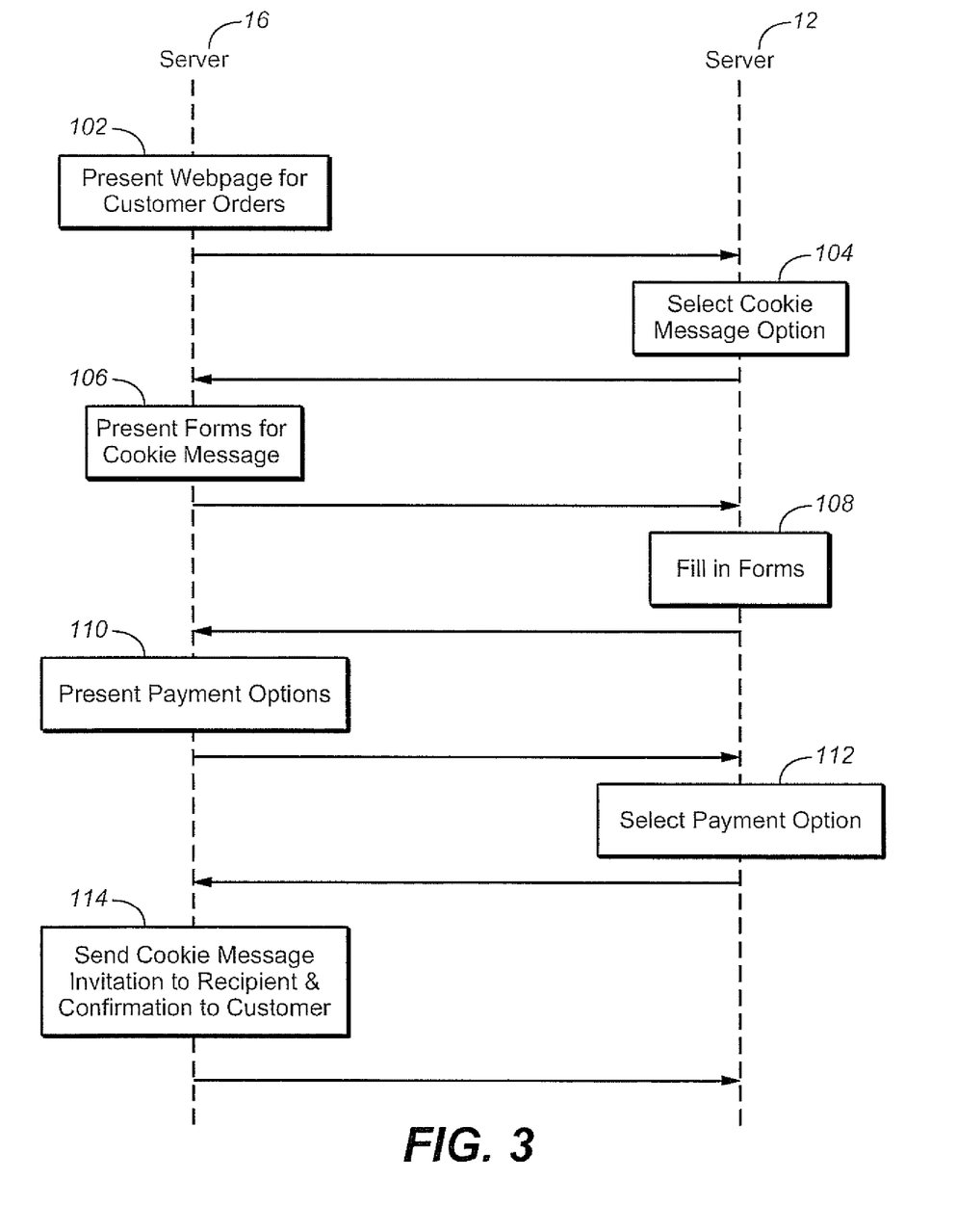
FIG. 3 is a flow diagram showing a process for ordering a redeemable cookie message to illustrate one embodiment of the invention.

The process for selecting to send a redeemable cookie message or an invitation to accept or reject the message to a recipient is illustrated in reference to FIGS. 3-9. FIG. 3 is a flow diagram showing a process for ordering a redeemable cookie message to illustrate one embodiment of the invention. Preferably, the customer already has an account with a merchant on behalf of which the server 16 is operated. If not, the potential customer may be prompted to sign up, so that the customer personal and financial information will be entered to server 16 and stored in a memory, such as the mass storage device 70 in FIG. 2.

Figure 4:
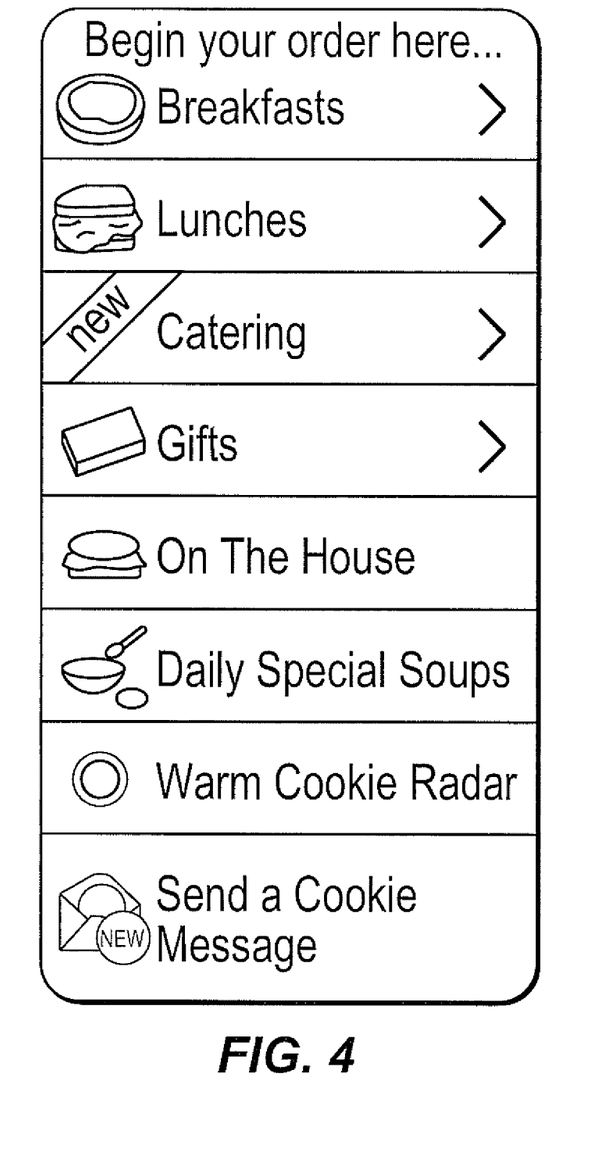
FIG. 4 is a diagram illustrating a portion of a webpage for enabling customers to select a redeemable cookie message for illustrating the embodiment of FIG. 3.

After the customer logs in, as shown in FIG. 3, the server 16 first presents a webpage to the customer through the internet and the customer information appliance 12 (block 102), where the webpage includes the sending of a redeemable cookie message as an option. FIG. 4 is a diagram illustrating a portion of such webpage for enabling customers to select a redeemable cookie message for illustrating the embodiment of FIG. 3. All a customer has to do is to click (e.g. by using curser control device 76 such as a computer mouse) on the box labeled "Send a Cookie Message" shown in FIG. 4 (block 104) displayed on the appliance 12, and the server 16 will start the process when this selection is detected. Server 16 then sends a form shown in FIG. 5 to the customer appliance 12, to be followed by the forms in FIGS. 6-8 as described below (block 106). FIGS. 5-8 are views of webpages displaying forms on the appliance 12 for a customer to fill in information regarding the recipient for sending a redeemable cookie message to illustrate the embodiment of FIG. 3. Instead of presenting multiple forms such as those in FIGS. 5-8, fewer forms or only one form may suffice, if all of the needed information may be requested by the fewer or only one form. Such and other variations are within the scope of this disclosure.

Figure 5:
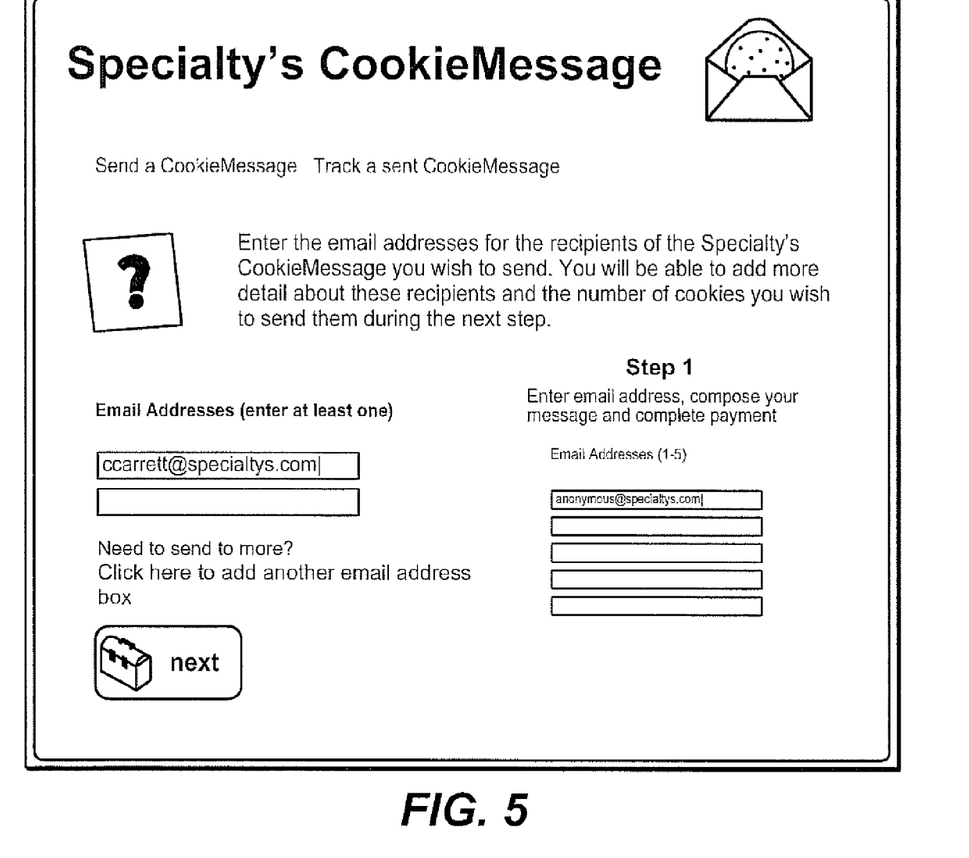
FIG. 5-8 are views of webpages displaying forms for a customer to fill in information for sending a redeemable cookie message to illustrate the embodiment of FIG. 3.
Figure 6:
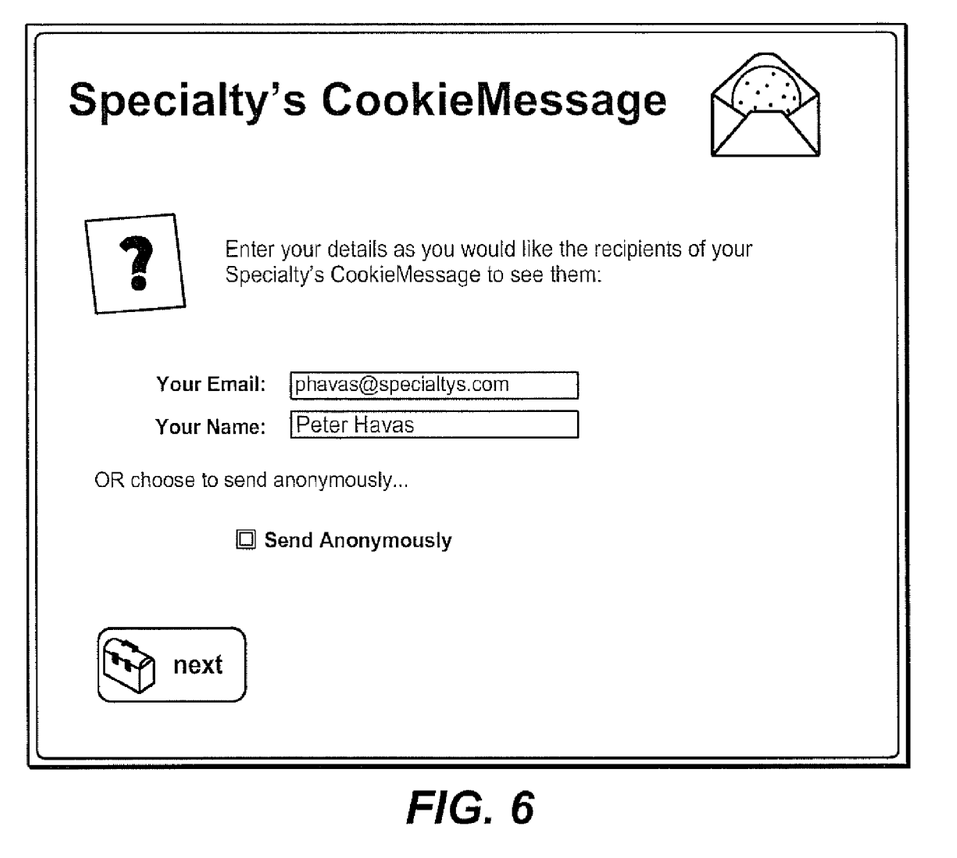
Figure 7:
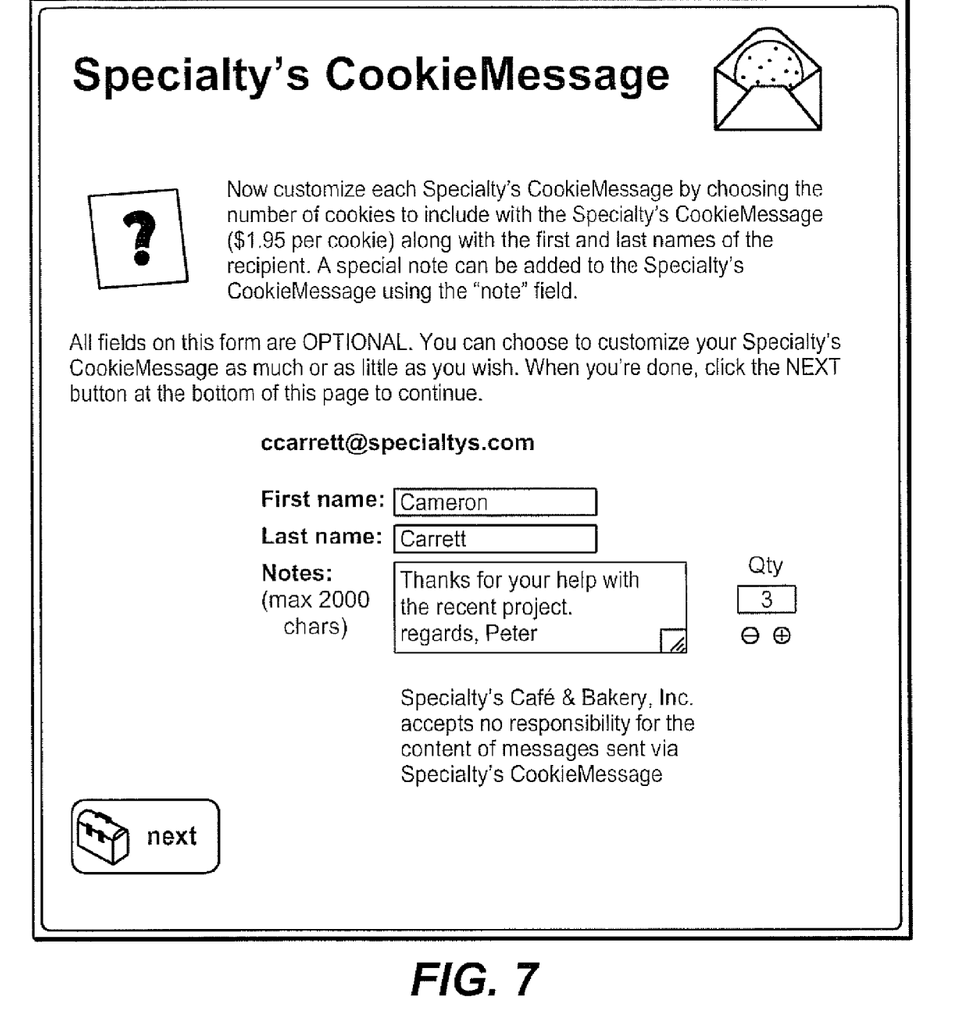
Figure 8:
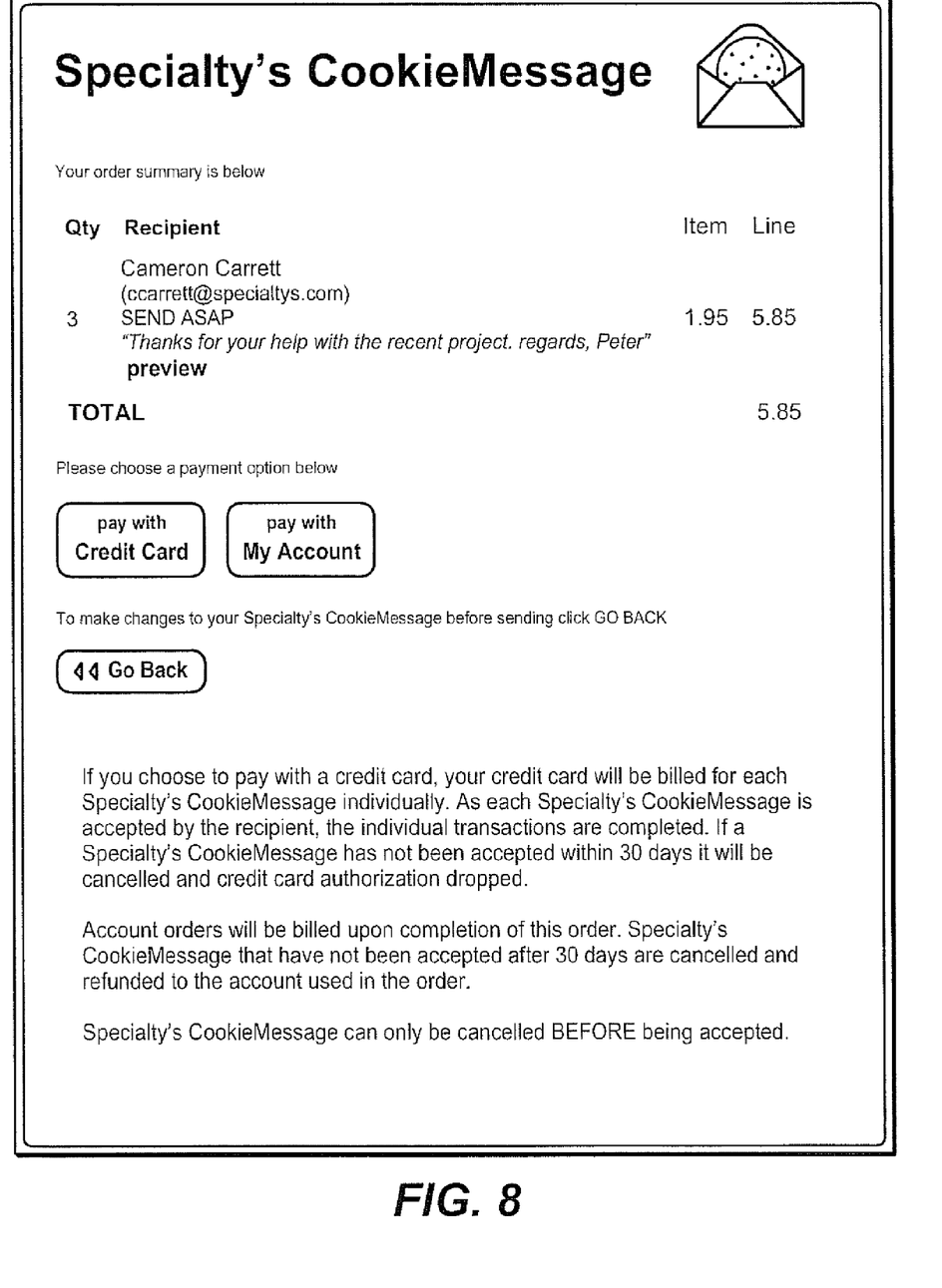
Figure 9:
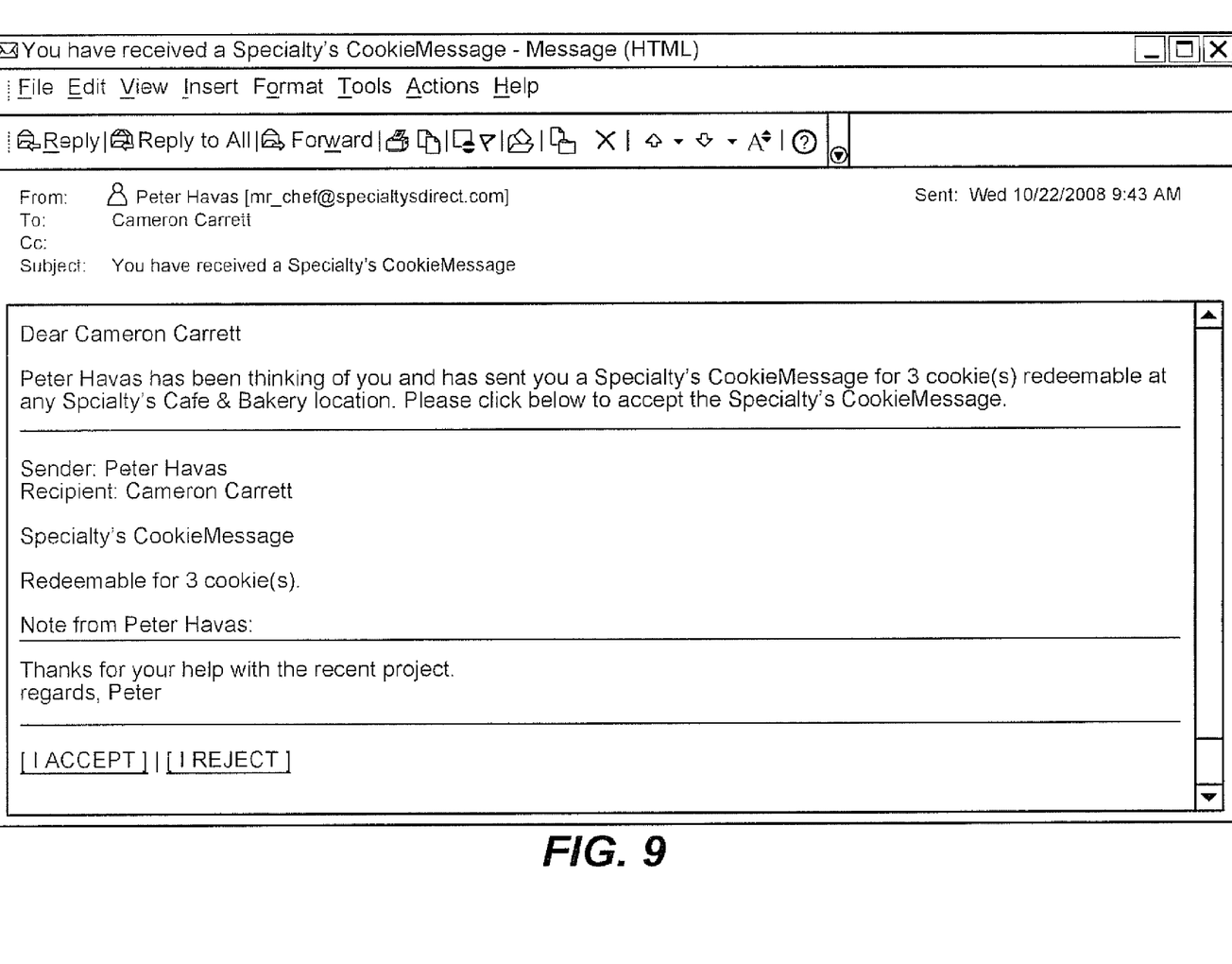
FIG. 9 is a view of a display of an invitation to accept or reject a redeemable cookie message for illustrating the embodiment of FIG. 3.

The customer is prompted by the form in FIG. 5 to enter e-mail addresses for people to whom redeemable cookie messages are to be sent. Any number of recipients can be designated. The customer is then prompted by the form in FIG. 6 to enter his or her e-mail address and name; alternatively the message can be sent anonymously. The customer is then asked to choose the number of cookies to be sent and any messages that should be sent along with the message by the form in FIG. 7. See block 108. The customer is then asked to choose a payment option (block 110) by the form in FIG. 8. The customer selects the desired option, and the server 16 sends an invitation to accept or reject a redeemable cookie message to the recipient or recipients, and a confirmation to the customer that the message has been sent to the recipient or recipients (block 114). FIG. 9 is a view of a display of an invitation to accept or reject a redeemable cookie message for illustrating this embodiment. As shown in FIG. 9, the invitation includes the message to the recipient or recipients inputted by the customer to appliance 12 and sent to the server, as well as the number of cookies that can be redeemed.

Alternatively, instead of sending an invitation to accept or reject the redeemable cookie message, the server sends the redeemable cookie message without asking the recipient whether he or she wishes to accept or not. This alternative may be desirable for some customers or some types of gift messages.

The above described method may be implemented by the system shown in FIG. 2. Thus, processor 64 executes software code read from device 70 and stored in main memory 66 to carry out the above method of FIGS. 3-9. Processor 64 may retrieve the forms, webpages and relevant customer information from device 70, for carrying out the above process, and stores the information inputted by the customer and the recipient (described herein in reference to FIGS. 3 and 10) in device 70. While device 70 is shown as an integral part of system 50, it can also be a stand alone device, such as a memory card, stick or disk, that can be inserted to the system 50.

Figure 10:
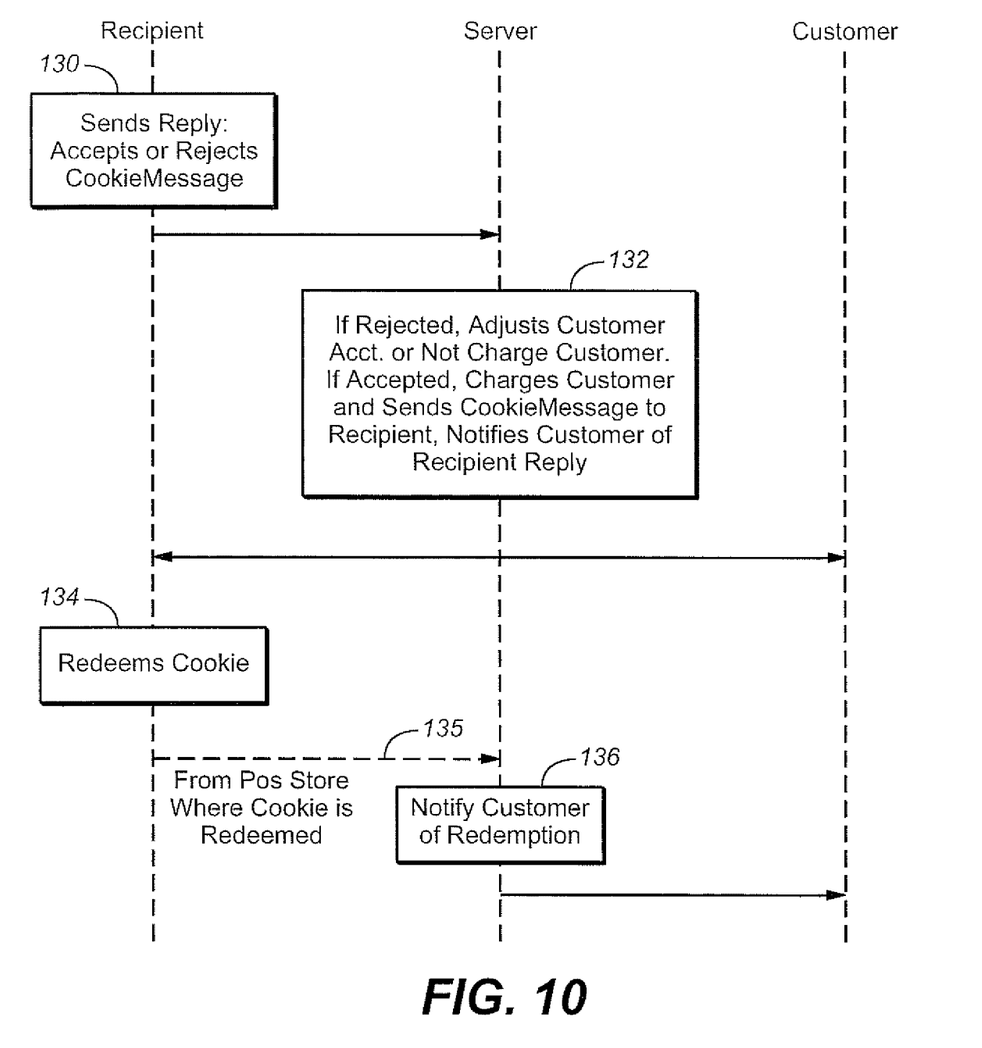
FIG. 10 is a flow diagram showing a process for redeeming a redeemable cookie message to illustrate one embodiment of the invention.
Figure 11:
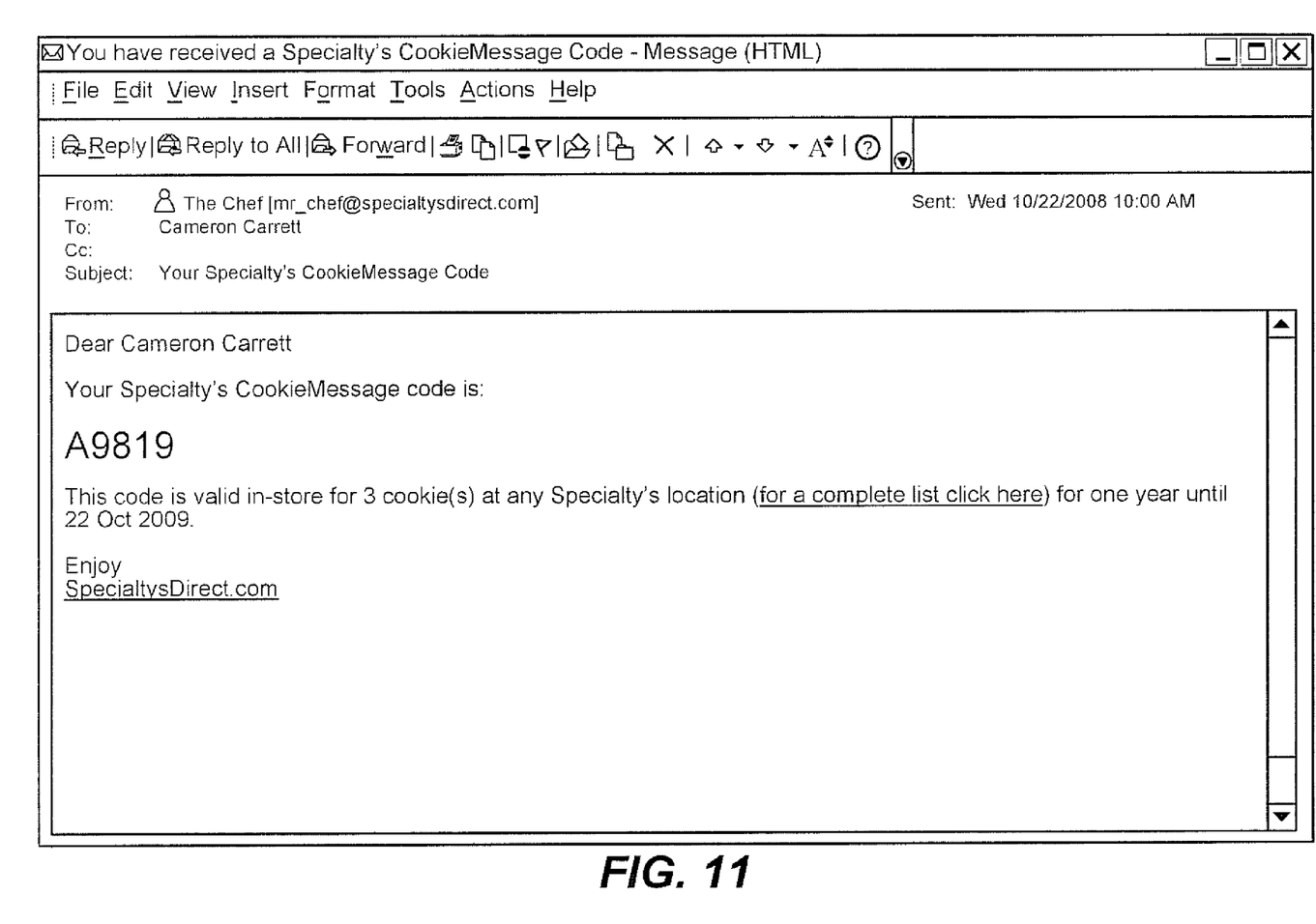
FIG. 11 is a view of a display of a redeemable cookie message sent to a recipient for illustrating the embodiment of FIGS. 3 and 10.
Figure 12:
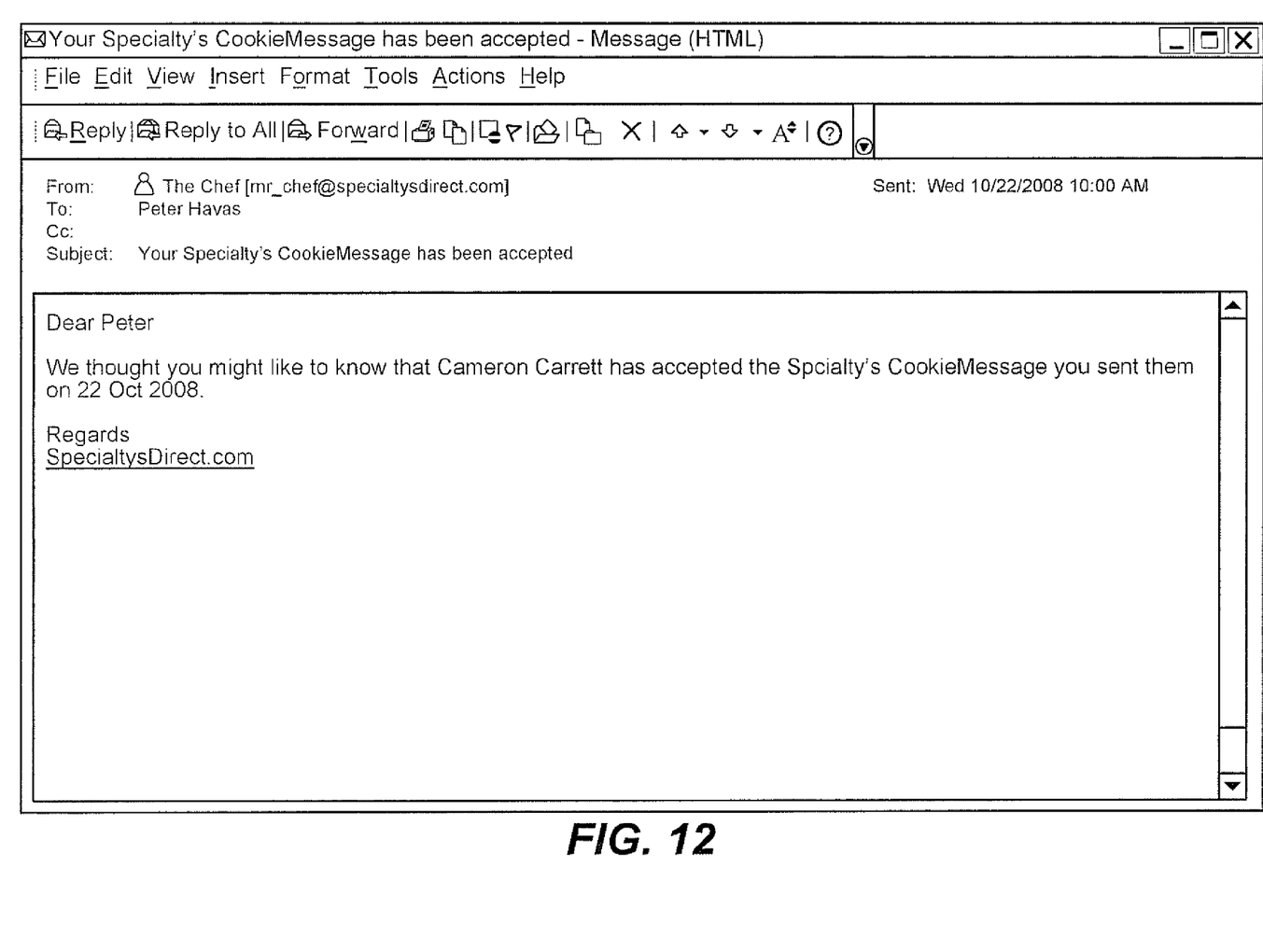
FIG. 12 is a view of a display of a notice to the customer that the recipient has accepted the redeemable cookie message for illustrating the embodiment of FIGS. 3 and 10.

FIG. 10 is a flow diagram showing a process for redeeming a redeemable cookie message to illustrate one embodiment of the invention. This process follows what has taken place already as described above in reference to FIG. 3. The last act in FIG. 3 is the sending of an invitation to accept or reject the redeemable cookie message to the recipient or recipients. The recipient or recipients sends a reply, accepting or rejecting the invitation (block 130) using appliance 14. If the invitation is rejected, server 16 will adjust the customer's account so that the customer will not be charged. If the customer's account has not been charged, then any pending charges will be canceled. If the invitation is accepted, server 16 will charge the customer and send the recipient or recipients the redeemable cookie message, such as one shown in FIG. 11. A confirmation notice either that the invitation has been rejected, or that the redeemable cookie message has been sent to and accepted, by the recipient or recipients will be sent to the customer (block 132). FIG. 12 is a view of a display of a notice to the customer that the recipient has accepted the redeemable cookie message for illustrating the embodiment of FIGS. 3 and 10. Preferably the redeemable cookie message includes a code that may be used at the point of sale (POS) for redemption.

If the server sends a redeemable cookie message without inquiring as to whether the recipient is accepting or rejecting the message, then FIG. 10 will need to be modified so that block 130 will be eliminated, and block 132 is revised to indicate that the customer account will be charged; server 16 will not notify the customer as to whether the message is accepted unless the recipient returns the message to server 16 to so indicate. Aside from such changes, the process in FIG. 10 described herein above and below can be used to implement this alternative method.

Figure 13:
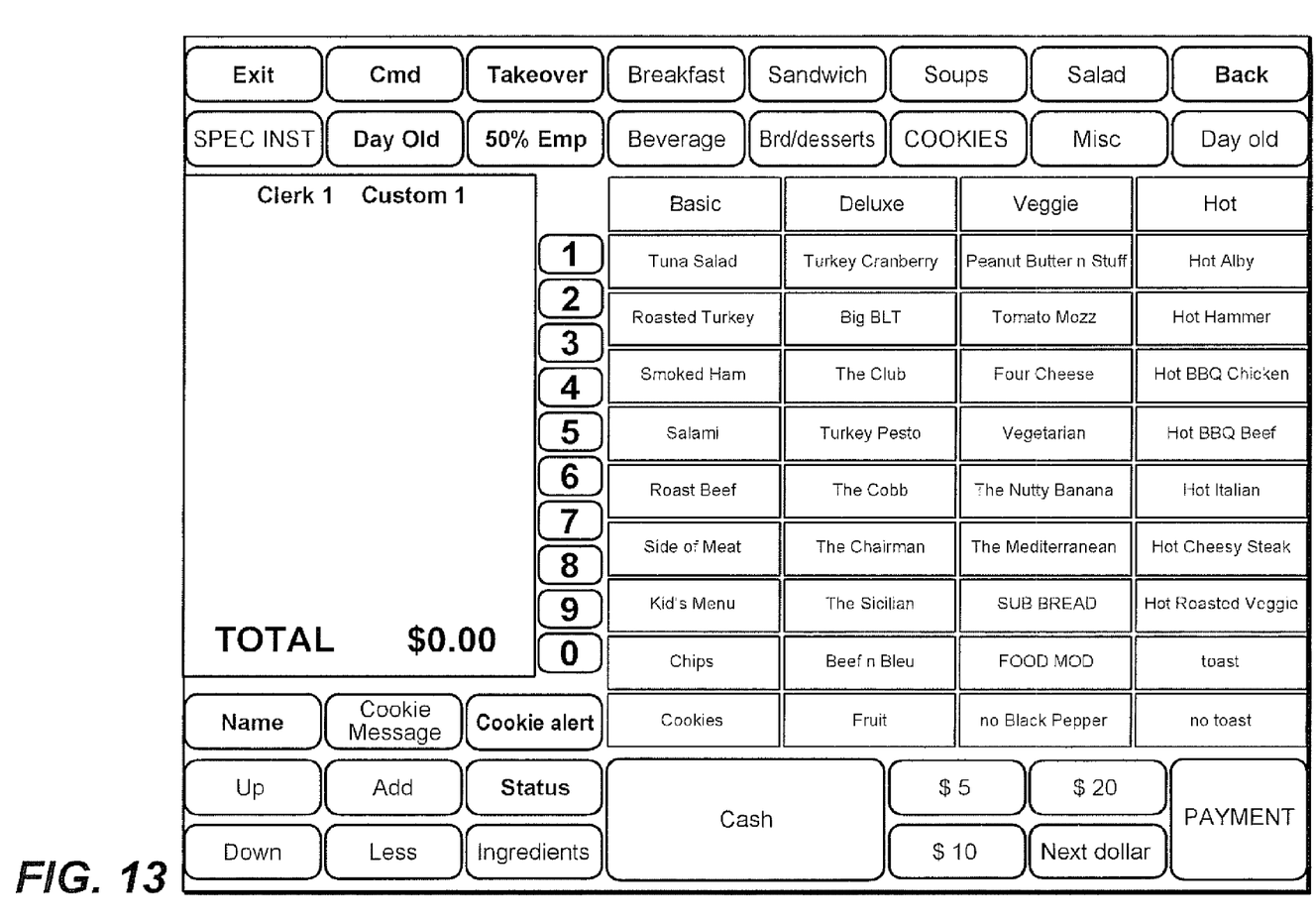
FIGS. 13-15 are views of displays illustrating a process carried out at a store where the redeemable cookie message is redeemed for illustrating the embodiment of FIGS. 3 and 10.
Figure 14:
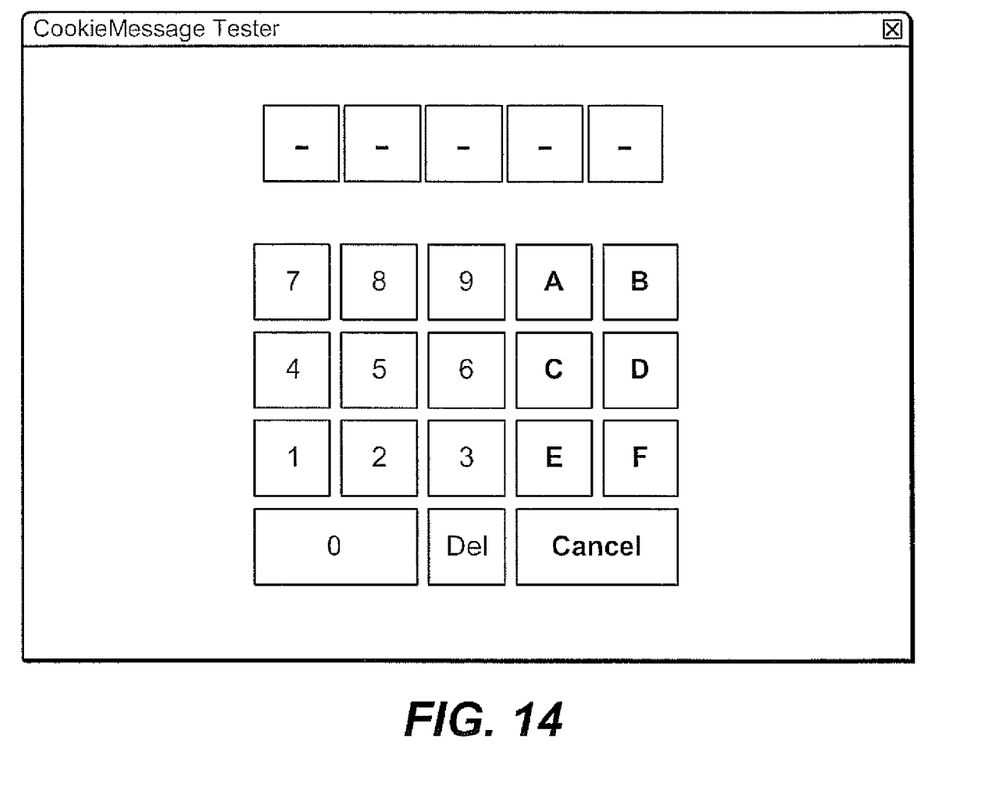
Figure 15:
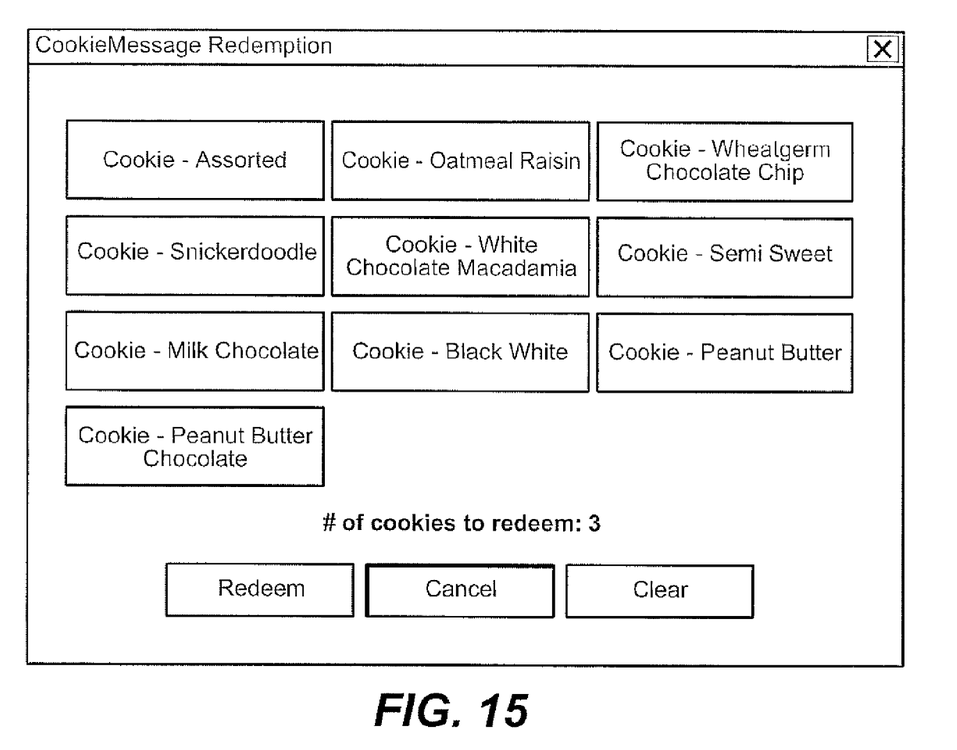
Figure 16:
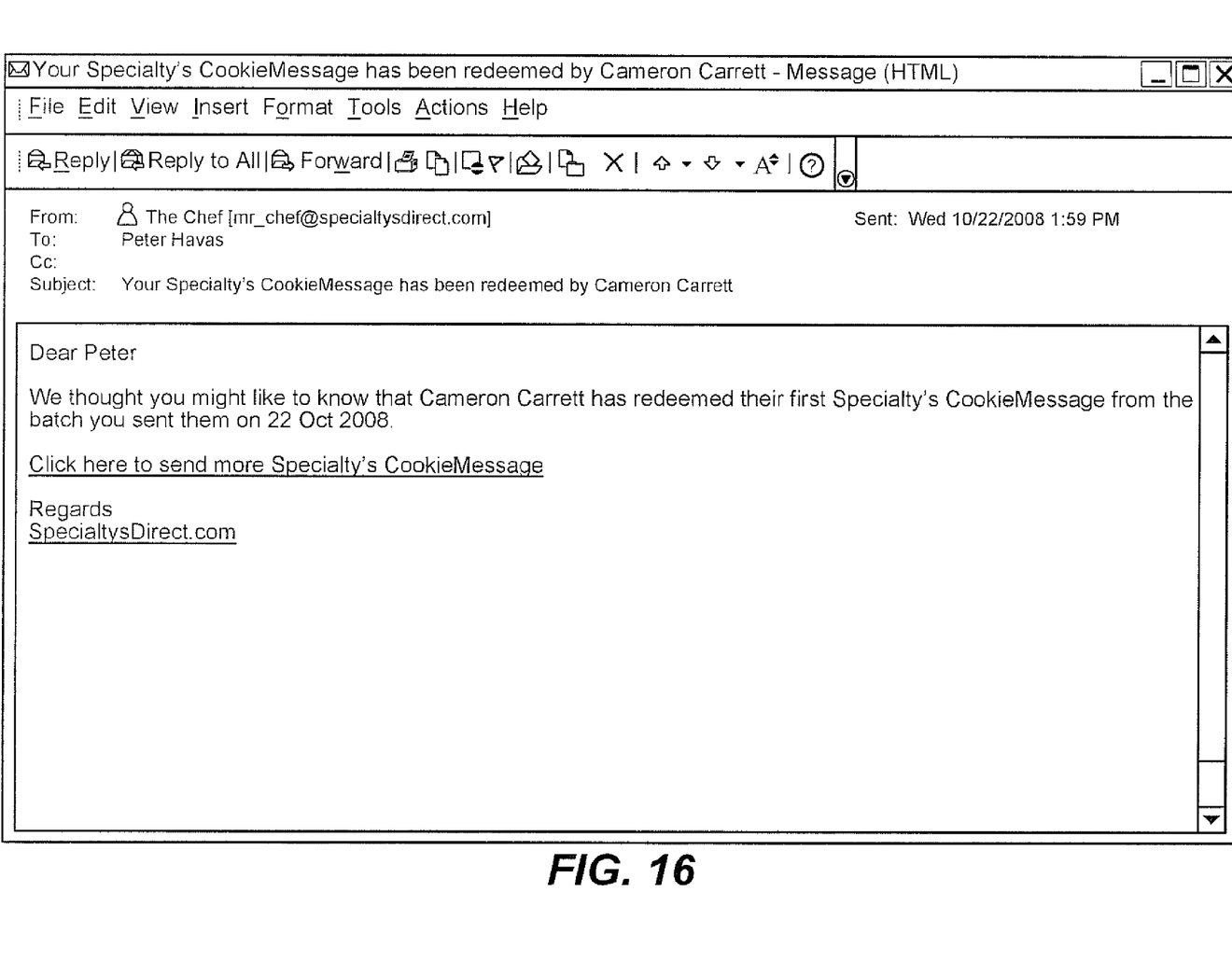
FIG. 16 is a view of a display of a notice to the customer that the redeemable cookie message has been redeemed for illustrating the embodiment of FIGS. 3 and 10.

The recipient or recipients may redeem the message at a POS such as a retail store (not shown). See block 134. FIGS. 13-15 are views of displays illustrating a process carried out at a POS where the redeemable cookie message is redeemed for illustrating the embodiment of FIGS. 3 and 10. A computer system such as that illustrated and described above in reference to FIG. 2 at the POS may be used to implement the method of FIG. 10. The recipient informs the cashier that they wish to redeem a redeemable cookie message. The cashier will hit the appropriate button in the main POS computer screen as shown in FIG. 13, and the computer screen shown in FIG. 14 appears at which the cashier will enter the code in the redeemable cookie message that has been relayed by the recipient. This is then followed by a computer screen shown in FIG. 15 indicating the number of cookies that can be redeemed by use of that particular code in the redeemable cookie message. The cashier also selects the flavor(s) of cookies that the customer has chosen as this properly decrements that product from inventory and rings those cookies up as a sale in the normal course of business. It should be noted that a single redeemable cookie message code may be used on multiple occasions until such time as the full number of cookies for which it is valid have been redeemed.

Upon the first redemption of a cookie using a redeemable cookie message code, the POS computer sends a message to the server 16 to so indicate, as illustrated by the dotted line 135 in FIG. 10. Server 16 notifies the sender of the redeemable cookie message by e-mail letting him or her know that the recipient has redeemed the redeemable cookie message (block 136).

Cookies are the favorites of a large section of the population, and they make excellent and relatively inexpensive gifts. The above system and method enable a customer to send a "thank you" message that is more substantial than an email message. The above system and method have proven to be highly successful. In addition to substantial anecdotal feedback from customers praising their merits and their features, over 10,000 redeemable cookie messages have been sent for around 15,000 cookies in less than a year of its commercial deployment.

While the embodiment above illustrates how a redeemable cookie message may be selected, paid for, sent and redeemed, essentially the same idea may be used for redeemable gifts other than cookies. Nor is the redemption limited to where POS are located. Other methods and systems of redemption may also be used. Such and other variations are within the scope of the disclosure herein.

While the invention has been described above by reference to various embodiments, it will be understood that changes and modifications may be made without departing from the scope of the invention, which is to be defined only by the appended claims and their equivalents.

What is claimed is:

1. A method for enabling gift transactions with cookies, comprising:
receiving a cookie gift order from a customer through an Internet-connected computing device, the cookie gift order specifying an electronic delivery address associated with a recipient, and a number of ordered cookies;
at a processor, transmitting a redeemable cookie invitation to the electronic delivery address, the redeemable cookie invitation comprising a prompt to accept the cookie gift order;
billing the customer according to the number of ordered cookies;
at a processor, in response to acceptance of the cookie gift order through the redeemable cookie invitation, transmitting a cookie code to the electronic delivery address, the cookie code redeemable at a cookie merchant for the number of ordered cookies;
in response to redemption of the cookie code at the cookie merchant at a first time for a first number of cookies less than the number of ordered cookies, decrementing a number of cookies redeemable at the cookie merchant with the cookie code by the first number of cookies;
notifying the customer of redemption of the cookie code for the first number of cookies; and
in response to redemption of the cookie code at the cookie merchant at a second time for a second number of cookies, decrementing the number of cookies redeemable at the cookie merchant with the cookie code by the second number of cookies.

2. The method of claim 1, further comprising decrementing a cookie inventory record of the cookie merchant according to redemption of the cookie code for a particular cookie.

3. The method of claim 2, wherein decrementing the cookie inventory record comprises decrementing the cookie inventory record according to a flavor of the particular cookie.

4. The method of claim 1, wherein receiving the cookie gift order from the customer comprises receiving an electronic delivery address associated with the customer, wherein notifying the customer of redemption of the cookie code for the first number of cookies comprises transmitting a notification to the electronic delivery address associated with the customer.

5. The method of claim 1, wherein receiving the cookie gift order from the customer comprises receiving a note from the customer, and wherein transmitting the redeemable cookie invitation to the electronic delivery address comprises transmitting the note to the electronic delivery address.

6. The method of claim 1, wherein receiving the cookie gift order from the customer comprises receiving a name of the recipient and an email address of the recipient, and wherein transmitting the redeemable cookie invitation to the electronic delivery address comprises transmitting the redeemable cookie invitation to the email address of the recipient.

7. The method of claim 1, further comprising receiving an electronic payment option from the customer, wherein billing the customer according to the number of ordered cookies comprises charging the electronic payment option in response to acceptance of the cookie gift order through the redeemable cookie invitation by the recipient.

8. The method of claim 1, further comprising withholding a charge to the electronic payment option in response to rejection of the cookie gift order through the redeemable cookie invitation.

9. The method of claim 1, further comprising notifying the customer, through the Internet-connected computing device, of acceptance of the cookie gift order.

10. The method of claim 1, wherein receiving the cookie gift order from the customer comprises receiving details of the cookie gift order through a webpage form displayed on the Internet-connected computing device.

11. The method of claim 1, further comprising receiving the cookie code, from the cookie merchant, over a computer network in response to initiation of a transaction between the recipient and the merchant with the cookie code.

12. The method of claim 11, further comprising transmitting, to the cookie merchant, a balance of cookies redeemable at the cookie merchant with the cookie code.

13. A method for enabling gift transactions with cookies, comprising:
receiving a cookie gift order from a customer through an Internet-connected computing device, the cookie gift order specifying an electronic delivery address associated with a recipient, and a number of ordered cookies;
at a processor, transmitting a redeemable cookie invitation to the electronic delivery address, the redeemable cookie invitation comprising a prompt to accept the cookie gift order;
billing the customer according to the number of ordered cookies;
at a processor, in response to acceptance of the cookie gift order through the redeemable cookie invitation, transmitting a cookie code to the electronic delivery address, the cookie code redeemable at a cookie merchant for the number of ordered cookies;
in response to redemption of the cookie code at the cookie merchant at a first time for a first number of cookies less than the number of ordered cookies, decrementing a number of cookies redeemable at the cookie merchant with the cookie code by the first number of cookies; and
in response to redemption of the cookie code at the cookie merchant at a second time for a second number of cookies, decrementing the number of cookies redeemable at the cookie merchant with the cookie code by the second number of cookies.

* * * * *